United States Patent [19]

Fenton et al.

[11] 4,150,257

[45] Apr. 17, 1979

[54] COMMUNICATION SYSTEM CALL COVERAGE ARRANGEMENTS

[75] Inventors: Francis M. Fenton; John A. Miller, both of Middletown; Thomas M. Quinn, Little Silver; James H. Van Ornum, Hazlet; Tse L. Wang, Matawan, all of N.J.

[73] Assignee: Bell Telephone Laboratories, Incorporated, Murray Hill, N.J.

[21] Appl. No.: 847,217

[22] Filed: Oct. 31, 1977

[51] Int. Cl.² .............................................. H04M 3/54
[52] U.S. Cl. ................................. 179/18 BE; 179/99; 179/18 BD
[58] Field of Search ............... 179/18 BE, 27 FH, 99, 179/18 BD

[56] References Cited

U.S. PATENT DOCUMENTS 4,046,972   9/1977   Huizinga et al. ...................... 179/99

Primary Examiner—William C. Cooper
Attorney, Agent, or Firm—David H. Tannenbaum

[57] ABSTRACT

Call coverage problems are solved in a telephone communication system by arranging the system on a station orientation basis so that any call directed to a station on any line appearance at that station will be covered by a single button on any one of a number of other coverage station sets. Any other station may also have its calls directed to that same coverage station set and, if desired, to the same call coverage button on the covering set. By separating ringing signals and flashing signals and by handling each on a station basis, it is possible to allow both ringing and visual signals of the call if covered by one station, whereas if call coverage is handled by another station it can be arranged so that only visual signals will be provided.

13 Claims, 7 Drawing Figures

| FIG. 3 |
| FIG. 4 |

FIG. 6A

DATA ITEMS

| | |
|---|---|
| OUTSIDE LINE TO STATION AND BUTTON TRANSLATION | STATION / BUTTON |
| STATION BUTTON STATUS | STATUS LED ON/OFF/WINK/FLASH |
| STATION RINGER CONTROL | RINGER ON/OFF |
| COVERED STATION TO COVERING STATION AND BUTTON TRANSLATION | STATION / BUTTON |
| INTERCOM NUMBER TO STATION TRANSLATION | STATION |
| SYSTEM ENABLES FORWARDING OF INTERCOM CALLS TRANSLATION | FORWARD ENABLE FOR ICM CALLS |
| STATION CALL, FORWARD-BUSY ENABLE TRANSLATION | CALL FORWARD-BUSY ENABLE |
| CALL FORWARD-BUSY TIMER STATUS | TIMER RUNNING VALUE |
| CALL FORWARD-DON'T ANSWER TIMER STATUS | TIMER RUNNING VALUE |
| RINGER TRANSFER TIMER STATUS | TIMER RUNNING VALUE |
| STATION CALL FORWARD-DON'T ANSWER ENABLE TRANSLATION | CALL FORWARD-DON'T ANSWER ENABLE |

*FIG. 6B*

DATA ITEMS

STATION BUTTON IDENTIFICATION
FOR OUTSIDE LINE BUTTON

| FUNCTION (OUTSIDE LINE) |
|---|
| RINGER ENABLE |
| PRINCIPLE STATION FLAG |
| NEXT STATION |
| NEXT BUTTON |

STATION BUTTON IDENTIFICATION
FOR CALL COVERAGE BUTTON

| FUNCTION (CALL COVERAGE) |
|---|
| CALL FORWARD RINGER ENABLE |
| NEXT STATION |
| NEXT BUTTON |

STATION BUTTON LINK POINTER

| LINK NUMBER |
|---| ns.

COMMUNICATION SYSTEM CALL COVERAGE ARRANGEMENTS

BACKGROUND OF THE INVENTION

This invention relates to a communication system call coverage arrangement, and more particularly to coverage arrangements which allow flexibility in answering stations.

One problem inherent in designing communication systems is that incoming calls to one station frequently must be rerouted to other stations under a variety of circumstances which include the original called station being unavailable because the called subscriber is otherwise busy or because the called subscriber is absent from the station set. In this situation it is desirable to have the incoming calls of one station answered or covered by another station.

A problem is that if the station to be covered (the called station) has more than one line then the covering station must have the ability to handle all of these lines in order to provide comprehensive coverage. In addition to causing large wiring problems in hardwired systems a further problem exists when the covering station is required to cover a multiplicity of stations. In such a situation the coverage station requires a large number of line appearance buttons thereby necessitating a telephone set in the nature of a call director set. A further problem is that in call coverage situations it is often desirable to have the main station ring for a given number of cycles prior to the coverage station becoming disturbed. It is also important that the main station have access to a call which has been covered by another station during the progress of the covered call. Thus, systems which have call coverage should be arranged to allow the original called station to retrieve the call, even during an "answered" call.

A compounding problem in call coverage situations is that whenever a station is moved or has a line reassignment it is also necessary to rearrange the coverage station and thus it is a general object of our call coverage arrangement to solve the above discussed problems, and it is a more specific object to accomplish station rearrangements without physical movement and without disrupting service.

A further object in designing call coverage arrangements is that some of the coverage stations may be in to the called station and thus it is not necessary to provide additional ringing but when the coverage telephone is physically separated, ringing as well as visual signals must be provided.

SUMMARY OF THE INVENTION

These problems and objects of call coverage are solved by arranging the system on a station orientation basis so that any call directed to the station on any line appearance of that station will be covered by a single button on any one of a number of other station sets. Any other station may also have any calls directed to that station answered from the same call coverage button on another station. A further advantage is taken by the separation of ringing signals and flashing signals which are handled on a station basis, such that if a call coverage is handled by one station both ringing and visual signals can be used, whereas if call coverage is handled by another station, ringing signaling means can be eliminated.

A further advantage of utilizing station orientation is so that minimum ring transfer can be accomplished on all of the lines with a single button as opposed to prior art schemes where it would require a ring transfer button for each line when it is desirable to activate a ring transfer scheme.

DESCRIPTION OF THE DRAWINGS

The foregoing features and objectives together with the operation and utilization of the present invention will be more apparent from the following description, taken in conjunction with the drawing, in which:

FIGS. 3 and 4 are arranged, and

FIGS. 6A and 6B show a listing of typical files.

GENERAL DESCRIPTION—BACKGROUND

Before beginning a general discussion of the specific features claimed it may be helpful to review in general terms the operation of an overall system in which the claimed feature can be utilized. It should be borne in mind that such a feature can be used in any number of similar type systems and thus only background information on one type of system will be presented. In addition, since communication system features may be used with different types of systems each dependent on different hardware constraints and upon different programming techniques, no attempt will be made to detail the entire program used to control the overall system, as such would cloud the issue and unnecessarily lengthen this specification. Quantities mentioned were engineered for particular time and memory requirements and will not be the optimum for all such systems.

It will, of course, be obvious to one skilled in the art that in order for the feature described and claimed herein to be used with any communication system, the feature must be blended into the overall structure of the system in which it is used and must be tailored to mesh with all of the other features and operations of such a system. Thus, in order to avoid confusion and in order to allow those skilled in the art to utilize the invention claimed herein this patent specification will concentrate on providing an understanding of the problems and constraints typically found in a communication system where the feature may be used. The patent specification will provide the logical steps necessary for the implementation and blending of the described feature into such a larger system, having many such features.

This patent specification is being filed concurrently with three other patent specifications, each directed to a different operational feature of a communication system. These patent applications are Nahabedian et al, Ser. No. 847,215, filed on Oct. 31, 1977, Fenton et al, Ser. No. 847,217, filed on Oct. 31, 1977, and Allison et al, Ser. No. 847,214, filed on Oct. 31, 1977, now U.S. Pat. No. 4,109,113, and are all incorporated by reference as though they were each reproduced in their entirety herein.

Typical Overall System Operation

Figure 1:
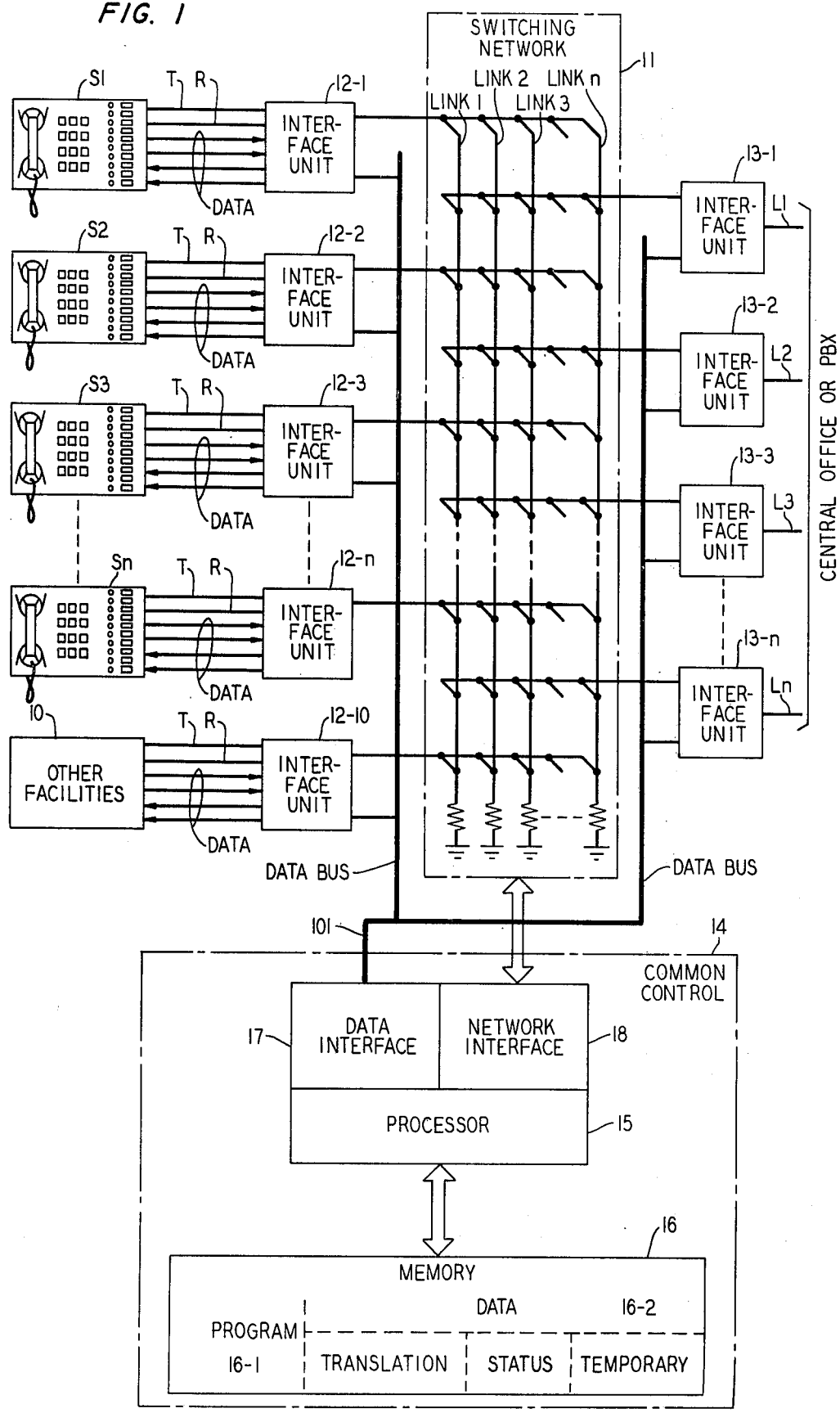
FIG. 1 shows an overall system configuration having several multibutton electronic telephone (MET) stations (and one single-line station)

One such communication system where the structure claimed herein can be used is a station oriented, solidstate, stored program control, business communication system. FIG. 1 shows a block diagram of such a system which combines the usual key system features (hold, visual indication, etc.) with many new features not previously available.

Call processing in the system is under the control of a microprocessor 15 in common control 14. Each station such as station S1, and line port, such as 13-1, is scanned to detect any changes in status. In response to any change (e.g., on-hook, off-hook, button depression, etc.), the processor, per instructions in the stored program in memory 16 translates these changes into system commands. The system also generates commands via a bidirectional data bus to the multibutton electronic telephone (MET) set, shown in detail in FIG. 2, to light the light emitting diodes (LEDs) and ring the tone ringer associated with the MET set. All of the MET sets provide TOUCH-TONE dialing, tone ringing, and LED indications. The LED indicators will be discussed hereinafter. The tone ringer provides two distinctive audible signals—low-pitched tone ringing to indicate incoming CO calls and high-pitched tone ringing to indicate incoming station-to-station (intercom) calls. The nonbutton key sets are used as station positions where only station-to-station (intercom) calling and/or outward dialing, via dial access pooled facilities or the CAP, are required. In this implementation the first (lower) four buttons on each MET station set are always the same. They are: Hold, +/−, and two System Access buttons, each associated with the intercom number of the particular station. The +/− feature is described in the aforementioned copending patent application of Fenton et al, Ser. No. 847,217. The System Access buttons are used to receive calls from other stations within the communication system (intercom) and to originate such calls or to access system facilities such as lines, paging ports, etc. Incoming calls may terminate on either System Access button depending on their busy-idle status. If the lower one is busy, a second incoming call comes to the second (upper) one, giving a visual call waiting indication, accompanied by a single audible ring if the station is off-hook. The System Access buttons are also used in conferencing and call transfer features, described in the aforementioned copending patent application Nahabedian et al, Ser. No. 847,215. The remainder of the buttons on the MET station sets are flexible buttons and can be assigned to any of the button-activated station features such as call coverage.

As shown in FIG. 1 there are three pairs of wires coming out of the MET set to the interface unit: T&R, data in, data out. The T&R pairs are connected to switching network 11. In the example shown a space division network with n links is shown. It may be replaced by a time division network with n time slots. The data link between the set and the processor is used to transmit information to the processor which will configure the switching network and send LED control signals back to the telephone sets accordingly.

Common control 14 consists of processor 15, interface units 17 and 18 and memory 16. The memory unit consists of a program store 16-1, and a data store 16-2. The data store is subdivided into the following:

A. Translation which contains the hardware configuration data. For example, the button assignments and station class of service.

B. Status which stores the state of the system at a given moment. For the station, it contains (a) station state: switchhook; +/− operation; whether actively connected to the network or not,
(b) button state: for each button
  (i) if I-Use is on
  (ii) what is the green status LED state
  (iii) which link is associated with calls on this button.

C. Temporary Data which is used to process a call and is a scratch-pad area.

A typical common control processor works on a 25 MS work cycle. A high level executive program, TSK-DSP, controls the order of tasks executed in a work cycle. At the beginning of each cycle, a hardware real time interrupt is received by the processor. The interrupt handling routine sets a flag and returns to the interrupted task which, in turn, will relinquish control to TSK-DSP control, as soon at it reaches a convenient break point. The task dispenser decides which task is to be executed next according to a schedule. Basically, these tasks fall into three categories:

(1) Scan: Scan for physical changes (e.g., a new button depression by a station). If a change is detected and confirmed, it will be stored in a temporary buffer to be processed later.

(2) Process: After all scans are completed, changes will be processed.

(3) Maintenance: If there is time left in the 25 MS cycle, the system will perform routine maintanance functions until the next work cycle begins.

The following features can be implemented by the system discussed herein.

I-Use Indication

Figure 2:
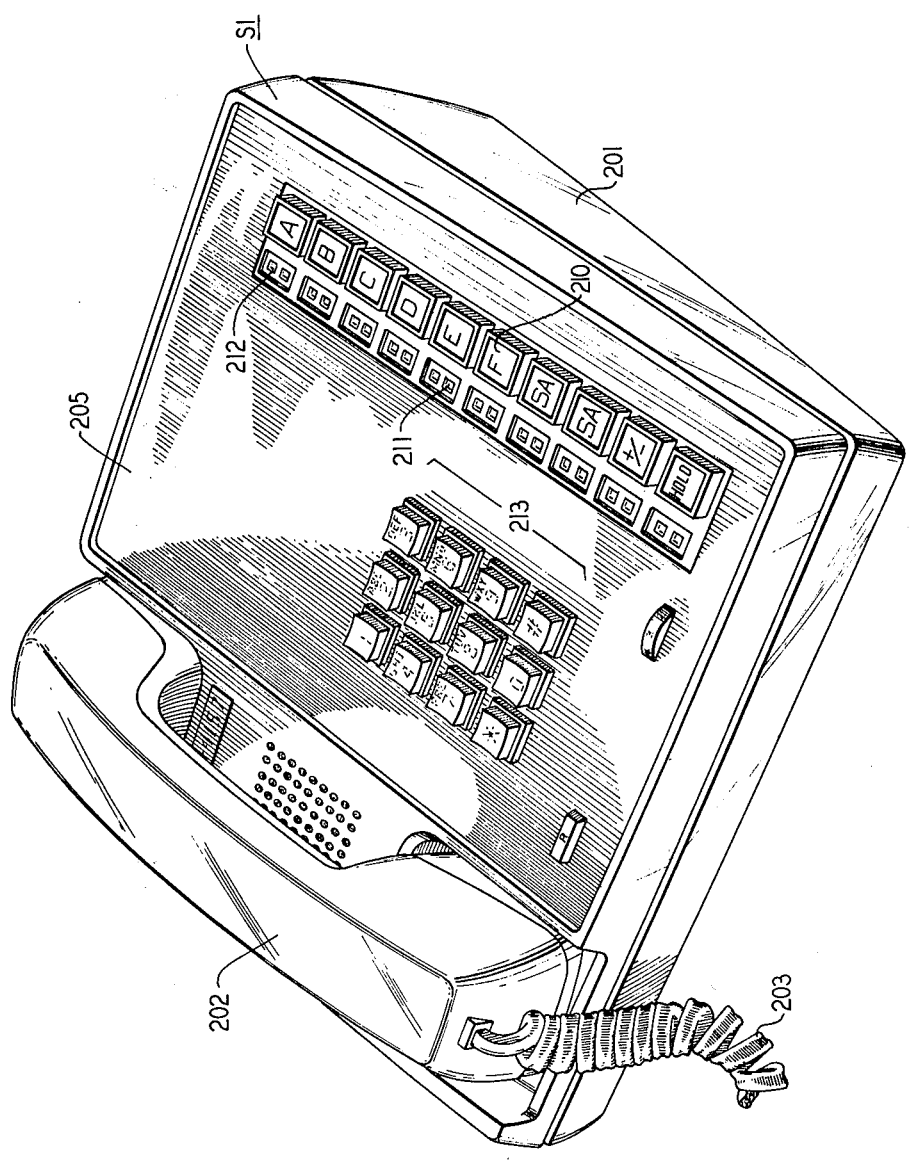
FIG. 2 shows a pictorial representation of a MET station set.

This feature provides a red I-Use LED, such as LED 212, FIG. 2, associated with each line access button (system access, pooled facilities access, personal line access, automatic intercom, and call coverage). When off-hook, this LED indicates the line to which the station is connected. When on-hook, this LED indicates the line to which the station would be connected upon going off-hook.

Line Status Indication

Call status indications are given by means of a green status LED, such as LED 211, FIG. 2, associated with each line access button (system access, pooled facilities access, personal line access, automatic intercom, and call coverage). The status LED flashes (500 ms on, 500 ms off) during the ringing state, lights steadily during the busy state, and winks (450 ms on, 50 ms off) during the hold state.

Automatic Intercom

Automatic intercom is provided by a 2-way point-to-point voice path between two designated MET stations with automatic signaling of the called station. Upon depressing an automatic intercom button and going off-hook, the calling station user hears ringback and the called station receives the standard station-to-station distinctive alert. The status LED associated with the automatic intercom button is steady at the calling station and flashing at the called station. The called station user may answer the call by depressing the automatic intercom button and going off-hook.

Call Coverage

Call coverage is associated with a group. Each station has the option of being a sender into a given group. As a sender, that station's calls may be answered by coverage buttons associated with that group. In addition, each station has the option of being a coverage position for one or more groups—one equipped with a COVR button (or buttons) to answer calls directed from senders into the group (or groups). The status LED associated with a COVR button at each coverage station flashes whenever a station-to-station or attendant extended call is ringing at a sender station into the group. Call coverage is provided to personal line calls only if the principal station (the single station designated principal owner of that personal line) is a sender for the group. If a coverage station answers the call by depressing COVR and going off-hook, the associated status LED will indicate busy and all other COVR buttons will go idle (free to track new calls). The sender station whose call was answered will also receive a busy status indication on the line that was ringing, and it may bridge onto the call at any time by selecting that line.

If two or more eligible calls are ringing within the coverage group, the first coverage button of this group on a station will track whichever call was first to start ringing, the second coverage button of this group on the same station, if it exists, tracks the second call, et cetera. If calls directed to a station have no idle button appearance on which to terminate, busy tone will be given to the caller and this feature will not be invoked.

A station may cover for several groups by having a separate call coverage button for each group; however, a station can only send into one group. Each coverage group may have up to 8 coverage positions (i.e., 8 coverage buttons may be defined for any given group).

Ring Transfer

Ring transfer is accomplished by equipping any sender station into a Call Coverage group with a RING TRFR button to transfer audible ring to predetermined Forwarding Destination stations having coverage buttons for the associated group after a single burst of ringing. Depressing the RING TRFR button will activate this feature and light the button's status LED. Once activated, the feature will transfer ringing on any future call directed to the station. The feature is deactivated by a second push of the RING TRFR button. Except for the audible ring at the Forwarding Destinations, such calls are treated exactly as with basic Call Coverage. Any or all stations having coverage buttons for the group may be designated as Forwarding Destinations for this feature as well as Call Coverage on Busy and Call Coverage and Don't Answer.

Any sender station into a Call Coverage group may elect to have this feature. Calls directed to an idle button appearance on the sender station, while that station is busy on another line, will start ringing at predetermined Forwarding Destination stations for the associated group after a single burst of ringing at the sender station. Calls directed to the sender station and left unanswered for 1 to 15 rings (option) will transfer ringing to predetermined Forwarding Destination stations for the associated group. Except for the audible ring at the Forwarding Destinations, such calls are treated exactly as with basic Call Coverage. Any or all stations having coverage buttons for the group may be designated as Forwarding Destinations for this feature as well as Call Coverage on Don't Answer and Ring Transfer.

Plus-Minus Conference

By means of the plus/minus button, any station user may combine up to four separate calls into a single conference call—provided no more than two outside calls are involved. The conference may be established by placing and holding each individual call and then adding them together upon reaching the final party. Alternatively, idle lines may be added directly to the active call. Adding a held or idle line to an active call is achieved by depressing the plus/minus (+/−) button and then depressing the held or idle line button. All line appearances associated with an active conference have busy status and active I-Use (red LED) indications. Any attempt to add a sixth station to the conference will be ignored by the system.

The station user may hold a conference (without breaking the talking path between the held parties) by depressing the HOLD button, and may reenter a held conference by depressing the line button associated with any of the held parties. The originator of a conference may selectively drop an active conferee by depressing the plus/minus button and then depressing the line button of the party to be dropped. Hanging up or selecting another line while active on a conference will terminate the station user's participation in the conference and transfer supervision to other internal stations associated within the conference. If no other internal station is available to assume supervision, the call is terminated unless there is a progress tone (ringback, busy, reorder) on the call.

The status LED associated with the plus/minus button is lighted whenever the plus/minus button is activated and is extinguished by any subsequent line button depression—including plus/minus and the switchhook.

Distinctive Alert

Distinctive alerting allows the station user to distinguish between incoming CO calls and incoming station-to-station calls. One tone is used as the alert for incoming CO calls extended by the attendant or on a personal CO line. A second higher frequency tone serves as the audible alert for station-to-station (intercom) calls. Each of these signals has a repetition period of 4 seconds with a 1-second on-time and a 3-second off-time.

Manual Exclusion

This feature allows the station user equipped with an exclusion button to exclude the answering position and others from bridging onto an existing call and also drops those stations already on the call. This feature may be cancelled manually by a second depression of the exclusion button permitting bridging, or canceled automatically by going on-hook. The manual exclusion status LED is lighted steadily whenever the feature is active on a nonheld call. When the call is held, exclusion remains in effect and the status LED of the exclusion button winks until the call is reentered by the holding party. This feature can be applied to only one call at a time. Stations excluded from a call hear silence and can receive no I-Use indication on the excluded line. After this feature is activated, the controlling station may use the conference feature to add selected internal stations into an "excluded" outside call; however, other stations can not add any parties to this call.

Personal Line Access

This feature provides a communications channel between a station user and a dedicated outside line via the switching network. Unlike pooled facilities, which can also be accessed by dial codes, personal lines are only accessible by means of a dedicated access button, which provides incoming as well as outgoing service.

A personal line may be shared by as many as eight stations by providing each of these stations with the associated personal line access button. Because of the conference limit, however, no more than five parties may be on any given call. Any attempt by a sixth station to bridge on will be ignored (i.e., handled as an excluded station). Full common audible ringing may be provided optionally to any or all stations sharing the line. Control of the line with respect to call coverage features is available to only one designated station.

Pooled Facilities—Button Access

Upon depressing a pooled facilities access button and going off-hook, the station user is connected to an idle line facility belonging to a common pool of outside lines (e.g., CO, FX, WATS, et cetera). The status and I-Use LEDs associated with the pooled facilities access button will light steadily, and the station user will be free to complete the call. If no idle facilities are available (facilities busy indication), a user's attempt to originate will simply be denied and the I-Use indication will be extinguished. A station requiring button access to several line pools may be equipped with a separate access button for each of the required pools. Each line pool may optionally be assigned a dial access code, permitting selection of an idle line from the pool by dialing the code after having originated on a system access button. Reorder tone will be returned if no lines in the selected pool are idle.

Facilities Busy Indication

This feature keeps the station user informed of the availability of any of the idle lines in any pooled facility group accessible to the station by means of a pooled facility access button. The status LED associated with a pooled facility access button will indicate busy whenever all the lines within the associated pool are busy, as well as when a line in the pool is being used at a given station.

Pooled Facilities—Dial Access

Upon selecting an idle system access button and dialing the appropriate access codes (9 or 10X), a station user will be connected to an idle line facility belonging to a common pool of outside lines (e.g., CO, FX, WATS, et cetera). The status and I-Use LEDs associated with the system access button will be lighted, and the station user will be free to complete the call. If no idle facilities are available, the user's attempt to originate will be denied and reorder tone will be given. This feature is intended for nonbutton sets and MET sets not provided with an appropriate pooled facility button.

Prime Line Preference

This feature automatically connects the station user, upon going off-hook, to the line designated as the prime line. A station user may override this preference by preselecting another line or depressing the HOLD button prior to going off-hook. If ringing line preference is also in effect at a given station, that feature takes precedence.

Ringing Line Preference

For an on-hook station, this feature automatically selects a line access button which has a call ringing the station set. If two or more lines are ringing simultaneously, the station user is connected to the first line to start ringing. If the user wishes to use a different line, the line must be preselected prior to going off-hook. Once a station is off-hook, ringing line preference will be canceled on any subsequent call until the user returns to the on-hook state. If ringing ceases while the station user is still on-hook, line preference reverts to whichever option is applicable—no line or prime line.

Station Call Transfer

By means of the plus/minus button, any station user may transfer any call to any station. Transfer may be achieved by holding the call to be transferred, placing a call to the desired station, depressing the plus/minus button, depressing the button associated with the held call, and then hanging up. Alternatively, an idle button may be plussed directly to the active line, after which the desired party may be dialed. A call transferred from one station to another and left in the ringing state for more than 120 seconds will be terminated if the transferring station is no longer active. This prevents an unmonitored transferred call from indefinitely tying up the system and the CO facilities.

Station-to-Station Calling

This feature allows a station user to directly dial other stations within the system without the assistance of the attendant. This is accomplished by selecting an idle system access button and dialing the intercom code of the desired station.

Other communication systems in which these features could be used are shown in U.S. Pat. No. 3,660,611 issued May 2, 1972 in the name of Knollman et al, and in U.S. Pat. No. 4,046,972 issued Sept. 6, 1977 in the name of Huizinga et al, which patent also shows the multibutton electronic set. The switching network and line circuits shown in FIG. 1 can be of the type shown in U.S. Pat. Nos. 3,991,279 and 3,991,280, both issued Nov. 9, 1976, and in copending application of J. J. Shanley, Ser. No. 846,162, filed on Oct. 27, 1977, now U.S. Pat. No. 4,110,566.

General Description—Operation Example of Call Coverage

With reference to FIG. 2, assume that a call is incoming to station S1 on button A. This call would cause the line status lamp (the lower of the two LEDs) associated with button A to flash. In the situation where immediate call coverage is available and where station S2 has coverage capability on any preselected button, such as, for example, button C, then the lamp associated with button C at station S2 would flash.

As discussed above, if station S2 were in the same office as station S1 it might be determined by the user that it is not necessary to have the ringer at station S2 also operate, thereby reducing confusion and distraction. In such a situation the system can be arranged such that only the lamp associated with button C at station S2 would operate. Where station S2 was located at some other physical location, then the system could be arranged, as will be discussed, such that both the lamp and the ringer will operate at station S2. Also, it should be noted that a third station could also be a coverage station for station S1 and the third station could or could not have its ringer activated on a coverage call to station S1 independent of the action taken at station S2 for station S1 coverage calls.

Also, as will be detailed, button C at station S2 which is used to handle coverage calls for station S1 can also be used to cover calls for any other station in the system.

As will be detailed, call forwarding occurs when a call incoming to one station is transferred to other stations with abbreviated ringing at the called station. Such an arrangement is a subset of call coverage and is implementable, also on a per station basis, such that all calls to a station will go to other designated stations.

During the call coverage period when station S2 has answered a call directed to station S1 it may happen that the station S1 user returns to the office or otherwise becomes available to answer the call. In such a situation, the user at station S1 merely lifts the handset and operates the button associated with the incoming call and a communication connection is established to the calling party, even though station S2 is also on the connection.

Detailed Description

In the status memory (FIG. 1, item 1b) there is stored for each button on each station set the following information:

(a) the instantaneous state of each LED (on/off) for the two LEDs associated with the button;

(b) the long term state of each LED (flash, wink, on, off). This is called the Station Button Status (SBS) for the status LED and the Station Button I-Use (SBI) for the I-Use LED.

Also, for each station set, there is a status memory location for recording:

(c) the last detected instantaneous state of the station's switchhook and buttons;

(d) the desired state of the station's tone ringer (on/off, volume setting, frequency setting).

Periodically, the processor (FIG. 1, item 15) takes the information in (b) and uses it to update the instantaneous information in (a).

Periodically in the scan cycle, the processor takes the information in (a) and (d) and assembles it into a single long message for a single station in the format required by the MET station set. This data is transmitted to the MET using the data interface (FIG. 1, item 17). The MET returns to the processor, via the data interface, the instantaneous state of its switchhook and buttons.

The returned data is compared with that in (c) above and if there are any changes, records these in a temporary buffer for that station. At a different time, another processor action called Process picks up this stimulus and causes the appropriate feature actions to be initiated in response to that stimulus.

Whenever the processor program wishes to turn on or off an LED on a MET, or set it to wink or flash, it writes the appropriate bits into the status memory described in (b) and this function will automatically occur as a consequence of the two periodic actions described above.

For each button, there is a translation record stored in the translation memory (16-2 of FIG. 1), SBID (station button identification), to identify the type of button. This information is coded in numerical form, e.g., a value of 1 identifies a personal line button, a value of 2 identifies a pooled line button, et cetera.

For a speech-type button (e.g., system access, autointercom, personal line, pooled line, call coverage, et cetera), there are four possible states which will be shown to the user on the status LEDs: namely, busy—(LED steady on), idle—(LED dark), ring—(LED flash), hold—(LED wink).

This information is stored in the status data memory (16-2 in FIG. 1) coded in numerical forms. For a non-speech-type button like message-waiting, the same data format is used although the valid states may reduce to two (busy and idle).

As described earlier, the scan routines in the system detect and report a button push by the MET user to a buffered area to wait for the process routines to process. When such a change is processed by the process routines, the button identification information, SBID, stored in 16-2 is first checked, then the button status information, SBS, stored in 16-2 is checked. The processor is thus able to interpret the button push to a specific user command and uses the proper programs stored in 16-1 to process the change. For example, button selection of (1) an idle (from SBS) speech-type (from SBID) button implies call origination requiring the associated facilities, (2) a ringing (from SBS) speech-type (from SBID) button implies answer a ringing call.

Figure 3:
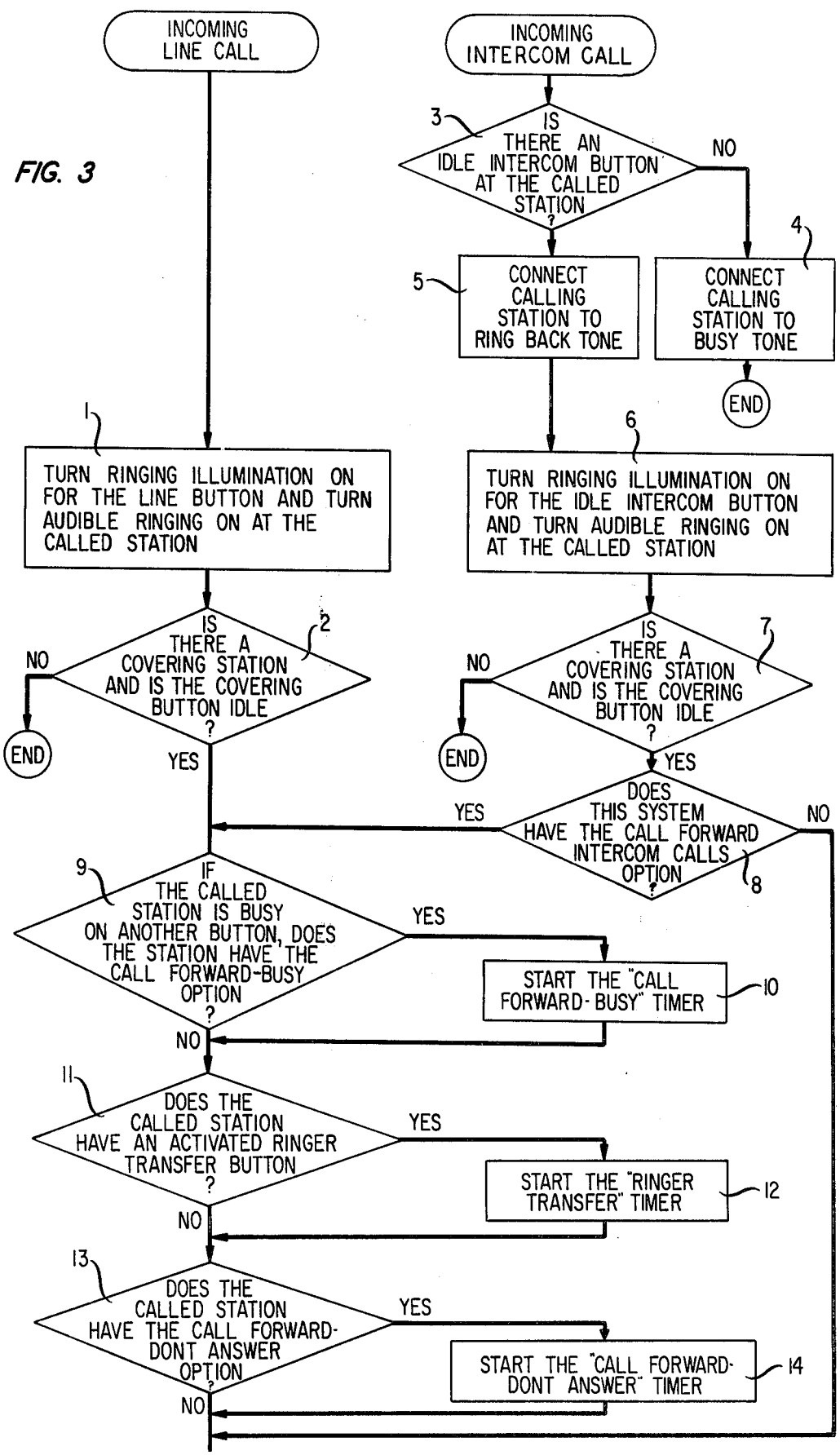
FIGS. 3 and 4 show a flow chart of the steps used to derive the claimed invention in one system.
Figures 4, 5:
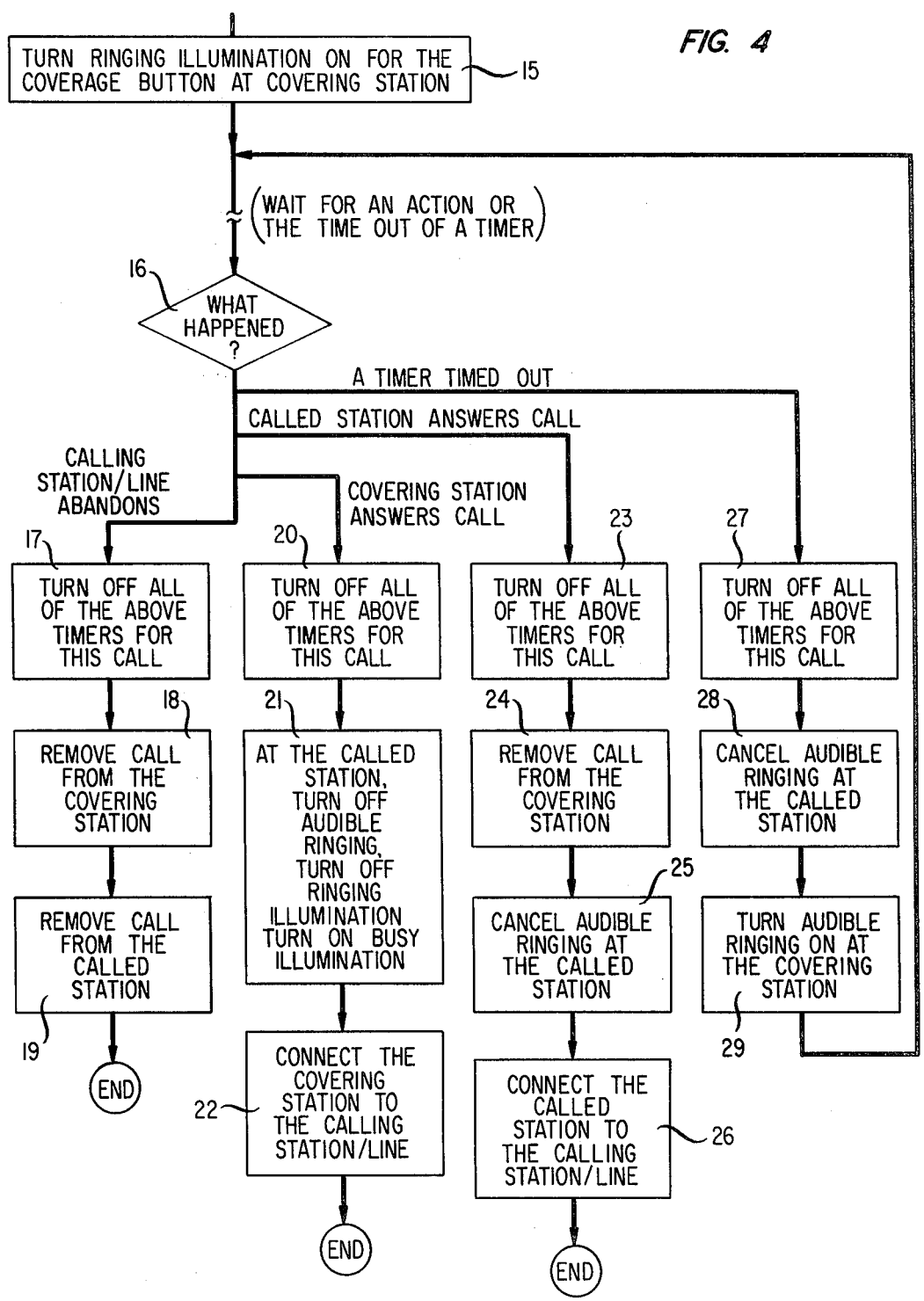
FIG. 5 shows how

The following discussion is made with reference to FIGS. 3 and 4 and shows the steps necessary to accomplish the claimed call coverage feature.

When an outside line is detected to be ringing, it is assigned an idle link and a record for that line (Outside Line to Station and Button Translation) is consulted to determine which station and which button on that station is to be connected to that line. All that is required to "rewire" that line to another station and button is to change this Outside Line to Station and Button Translation Record. Then in Step 1, ringing illumination is applied to the line button by changing the Status LED record to indicate "flash".

DETAILED DESCRIPTION 1

The link to which the outside line was assigned is recorded in the station button link pointer record. The Station Button Identification record is consulted for this station and button. This record has an entry which indicates whether this station should receive audible ringing for incoming calls to this button. It has another entry which indicates whether this station is the principal appearance for incoming calls on this outside line. If the station is the principal appearance, this fact is saved for use in step 2. The last two entries in the Station Button Identification Record shows the station and button of a second station which has an appearance of this outside line, if there is any other station with a bridged appearance of this line. As long as there are additional station appearances of this line (as indicated by the Station Button Identification Record for the station currently being placed into the ringing state) these stations will have the corresponding button illumination changed to ringing, button link pointer updated, and the audible ringer turned on as outlined above for the first appearance of this outside line.

In step 2, the Covered Station to Covering Station and Button translation record for the station with the principle appearance for this line (discovered in step 1)

is consulted to determine if the called station is covered by a covering station. If not, the incoming call handling is complete—normal handling continues at this point (monitoring for answer from called station or abandon from calling line). If the principal called station is covered, control continues at step 9. Since the Covered Station to Covering Station and Button Translation Record has an entry for each covered station, it is possible to have two different stations covered by the same single button on one covering station.

In step 3, an internal call (intercom call) has been detected, assigned to a link and an Intercom Number to Station Translation Record is consulted to determine which station is to respond to that intercom number. The called station is checked for an idle system access button. If none exist, control continues at step 4 with busy tone returned to the calling station. If an idle system access button does exist, control continues at step 5.

At step 4, a busy tone is connected to the calling station, indicating that there are no idle system access buttons at the moment on the called station. Incoming call handling is terminated at this point.

At step 5, an idle system access button has been found at the called station. Ringback tone is connected to the calling station indicating that the called station is ringing. Control continues to step 6.

At step 6, ringing illumination is applied to the idle system access button by changing the Status LED record to indicate "flash". The button link pointer record for this button on this station is changed to record the link number assigned to this call. Also, the audible ringer is turned on by changing the station ringer control record to indicate ringer on. Control continues to step 7.

In step 7 (similar to step 2), the Covered Station to Covering Station and Button Translation Record is consulted to determine if the called station is covered by a covering station. If not, the incoming call handling is complete. If the called station is covered, control continues at step 8.

At step 8, the system translation record Enable Forwarding of Intercom Calls is consulted. If forwarding of intercom calls is enabled, control continues at step 9. If forwarding of intercom calls is disabled, control continues at step 15.

In step 9, the Call Forward-Busy Translation record for the called station (principle station for outside lines) is consulted. If Call Forward-Busy is enabled and the called station is busy (talking on another button) control continues at step 10. Otherwise control continues at step 11.

At step 10, the call forward-busy timer is turned on to give a timer timed-out action after the call forward-busy delay time has elapsed. Control continues at step 11.

At step 11, the station button identification record for the called station is searched looking for a ringer transfer button as indicated by the function subrecord. If that button exists and the status is on, control continues at step 12. Otherwise control continues at step 13.

At step 12, the ringer transfer timer is turned on to give a timer timed-out action after the ringer transfer delay time has elapsed. Control continues at step 13.

At step 13, the Call Forward-Don't Answer Translation Record for the called station is consulted. If call forward-don't answer is enabled, control continues at step 14. Otherwise control continues at step 15.

At step 14, the call forward-don't answer timer is turned on to give a timer timed-out action after the call forward-don't answer delay time has elapsed. Control continues at step 15.

At step 15, ringing illumination is applied to the covering button at the covering station by changing the station button status LED record to indicate "flash". The link assigned to this call is recorded in the station button link pointer for the covering button at the covering station. The last two entries in the Station Button Identification Record for the covering button at the covering station shows the station and button of a second covering station if there is more than one covering station. As long as there are additional covering stations (as indicated by the Station Button Identification Record for the station currently being given ringing illumination) these stations will have the corresponding button illumination changed to ringing and the button link pointers updated. The incoming call handler then waits for an action associated with this call to occur. After the action does occur, control continues at step 16.

At step 16, the type of call handling action is determined. If the calling station or line abandons the call, control continues at step 17. If a covering station answers the call, control continues at step 20. If the called station answers the call, control continues at step 23. Finally, if one of the timers turned on in step 10, 12 or 14 times out, control continues at step 27.

At steps 17 through 19, the call is abandoned. Therefore, the timers turned on in steps 10, 12 or 14 are turned off. The call appearance at the covering station (ringing illumination on the covering button, button link pointer for the covering button and audible ringing if on for this call) is removed. Finally, the call appearance at the called station is removed. Incoming call handling then terminates for this call.

At steps 20 through 22, the call is answered by the covering station. Any timer turned on in steps 10, 12 or 14 is turned off. The call appearance at the called station is changed from ringing to busy by changing the called station button status to "on" and by turning the audible ringer control from on to off. Finally, the covering station has the call appearance on the covering button changed from ringing to busy, the corresponding I-Use illumination changed to ON, the audible ringer turned off and the covering station connected to the calling station/line. The call appearance is removed from any other covering stations. This terminates incoming call handling for this call.

In steps 23 through 26, the call is answered by the called station. Any timer turned on in steps 10, 12 or 14 is turned off. The call appearance is removed from the covering button at the covering station. The call appearance is changed to busy, and the corresponding I-Use illumination changed to ON at the called station. The called station is connected to the calling station/line. This terminates incoming call handling for this call.

In steps 27 through 29, the call is forwarded to the covering button at the covering station because a timer turned on in steps 10, 12 or 14 timed out. First, the timers turned on in steps 10, 12 or 14 are turned off. Then audible ringing is turned off at the called station. Then audible ringing is turned on at those covering stations which have an entry in their Station Button Identification Record for the covering button which enables audible ring in for call forwarding. Finally, incoming call handling continues at step 16, waiting for an action to occur (in this case, waiting for the calling station/line to abandon the call, or for the covering station to answer, or for the called station to answer).

Of course it is to be understood that the arrangements described in the foregoing are merely illustrative of the application of the principles of the present invention. Numerous and varied other arrangements may be utilized by those skilled in the art without departing from the spirit and scope of the invention.

What is claimed is:

1. A call coverage arrangement for use in a communication system having a plurality of stations each having capability of communicating with other stations over communication links internal to the system, each of said stations having a plurality of nonlocking buttons operable to establish features or communication connections to said station, said call coverage arrangement comprising a switching network having a plurality of links and a single communication connection extended to each station from said switching network, said connection being under control of momentary operations of said buttons, means for redirecting calls incoming to a first station on any line appearing at said first station to a selected other station of said communication system, said selected other station being termed a call coverage station, and means, including the designation of at least one of said buttons at said call coverage station as a call coverage button, said call coverage button operable to establish a communication connection to said call coverage station in response to calls redirected to said call coverage station from said first station.

2. The invention set forth in claim 1 further comprising means including one of said buttons on said first station operable for enabling a communication connection from said first station to a calling line even when said calling line has a communication connection redirected and established to said call coverage station.

3. The invention set forth in claim 2 further comprising means for inhibiting said redirecting means at a station when an incoming call at said station is answered at said station.

4. The invention set forth in claim 1 further comprising means for redirecting all calls incoming to a second station to said call coverage station associated with said first station, whereby said second station redirected calls are establishable to said call coverage station under control of said designated call coverage button.

5. The invention set forth in claim 4 wherein both audible and visual signals are used to indicate that a call is incoming on any of said buttons at each said station, means for inhibiting said audible signals at selected ones of said call coverage stations to which said first station calls are directed, while still allowing audible signals at other ones of said call coverage stations.

6. The invention set forth in claim 4 wherein both audible and visual signals are used to indicate that a call is incoming to any said station, and means for inhibiting said audible signals at said call coverage station when calls are redirected thereto from said first station while allowing said audible signals at said call coverage station for calls redirected thereto from said second station.

7. In a communication system having a plurality of stations each having capability of communicating with other stations over communication lines internal to the system as well as having the capability of communicating with stations external to the system over communication lines extended between the system and a central source, an arrangement for controlling incoming calls at each button of each multibutton telephone station set connected to said system, each said telephone station having a plurality of nonlocking buttons operable to control features or communication connections to said station, said arrangement comprising means for providing visual signals at each communication control button of each station set as an indication that a call is incoming to the line controlled by said button at said station, means for providing audible indications at each station as an indication of a call incoming to any line controlled by any button at said station, means for independently controlling said visual and said audible signals on a station basis so that any line which has a common appearance at a number of stations may have audible signals at only certain preselected stations, means, including the designation of one of said buttons at a first station as a call coverage button operable, for enabling a redirected communication connection between said first station and a first line at a second station to which an incoming call is currently being directed, said call coverage button at said first station also operable for enabling a communication connection between said first station and a second line at a third station to which an incoming call is currently being directed.

8. The invention set forth in claim 7 further comprising means for inhibiting said audible signals at said first station for redirected calls incoming thereto from said second station while allowing said audible signals at said first station for redirected calls incoming thereto from said third station.

9. In a multistation communication system having a number of multibutton telephone station sets, means for arranging certain of said stations into a call coverage group of stations with selected ones of said stations in said group being arranged as sender stations and certain ones of said stations being arranged as receiver stations, means for recording certain incoming calls to any said station designated as a sender station in said call coverage group, and means, including the establishment of one of said buttons as a call coverage button at each said receiver station within said call coverage group, for enabling communications from any receiver station in said call coverage group to any recorded incoming call to any said sender station in said call coverage group.

10. The invention set forth in claim 9 further comprising means for signaling at all call coverage stations a recorded incoming call to any sender station, and means for inhibiting said incoming call signal at all said stations when said call has been answered from any station.

11. The invention set forth in claim 10 further comprising means for visually determining the busy-idle status of the call coverage button at each said station, and means for providing a visual busy indication to the station answering a recorded incoming call while providing an idle indication to all other receiver stations in said call coverage group.

12. The invention set forth in claim 9 further comprising means for enabling communications to any other recorded incoming call to any other sender station from any other receiver station in said call coverage group while said first recorded call is enabled.

13. The invention set forth in claim 9 further comprising means operable when a call is answered from a sender station for inhibiting said call from also being answered at a receiver station, while still allowing a call which is answered first by a receiver station to be subsequently answered at the sender station.

* * * * *